3,210,949
ABSORPTION OF HYDROCARBON FROM RICH NATURAL GAS WITH NATURAL GASOLINE

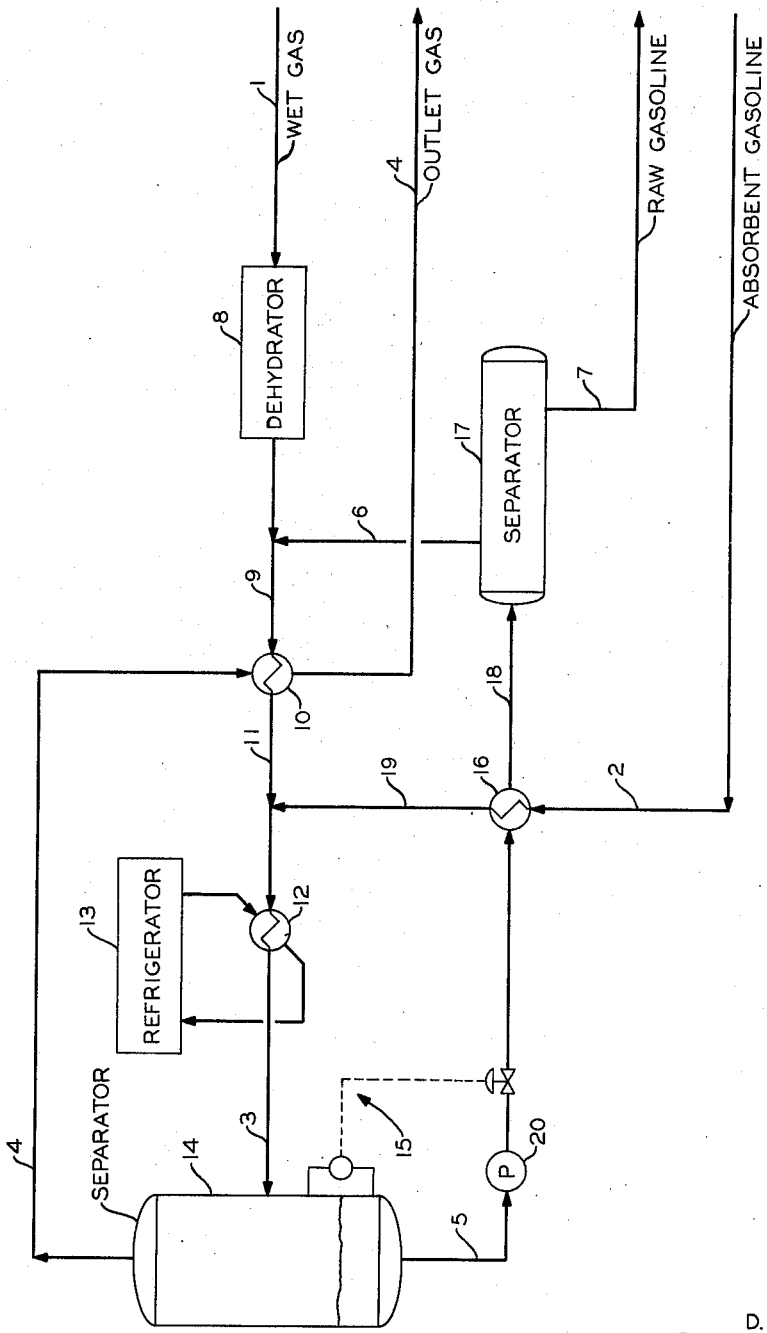

Donald R. Wienecke, Bartlesville, Okla., assignor to Phillips Petroleum Company, a corporation of Delaware
Filed Nov. 27, 1961, Ser. No. 155,068
3 Claims. (Cl. 62—17)

This invention relates to recovery of natural gasoline boiling range and liquefied petroleum gas hydrocarbons from natural gas containing such hydrocarbons. In one aspect it relates to recovery of such hydrocarbons at remote locations without need for a conventional absorber and related equipment.

Prior art extraction and recovery of natural gasoline boiling range hydrocarbons and liquefied petroleum gas hydrocarbons involve in one instance compression followed by condensation. Such operation is relatively inefficient as regards recovery of the desired hydrocarbons and is little used at the present time.

Another prior art process is the ordinarily used absorption-stripping operation. Such a plant requires use of an absorbent, such as a mineral seal oil or the like, with large and expensive absorber and stripping towers. Such equipment is quite expensive. Also, this operation requires considerable volumes of water for steam production and for absorption oil cooling purposes.

This present invention involves or provides a very simple process and relatively inexpensive equipment for separation and recovery of the above-mentioned products from natural gas. Little cooling water is required. Expensive absorber towers are also not required.

An object of this invention is to provide a method and apparatus for recovery of natural gasoline boiling range and liquefied petroleum gas hydrocarbons from natural gas containing such hydrocarbons. Another object of this invention is to provide a method and apparatus for recovering such hydrocarbons from natural gas which apparatus is relatively inexpensive to purchase and to install and very simple to operate. Another object of this invention is to provide such a method and apparatus which can be employed in remote areas. Other objects and advantages of this invention will be realized upon reading the following description which, taken with the attached drawing, forms a part of this specification.

The drawing illustrates, in diagrammatic form, an arrangement of apparatus parts for carrying out the process of this invention.

The process is best understood by reference to the drawing in which a wet gas, that is, a natural gas containing condensible hydrocarbons, is passed from a source, not shown, through a conduit 1 to a dehydrator unit 8. This dehydrator unit is required only in case the natural gas coming to this apparatus contains moisture which might freeze out at subatmospheric temperatures. The dehydrator can, if desired, be absorbent such as silica gel or if desired the dehydrator can involve use of a liquid process. Liquid processes are very efficient and frequently employ ethylene glycol or related glycols as the absorbent for the moisture. The use and operation of such dehydrating equipment is well understood by those skilled in the art and will not be described in detail herein.

Following dehydration the natural gas at well production pressure of for example about 500 to 600 p.s.i.a. (pounds per square inch absolute) passes on through a conduit 9 to one inlet of heat exchanger 10. The gas leaves the corresponding outlet of this heat exchanger at a temperature of for example $-15°$ to $0°$ F. The cooling medium for this heat exchanger is produced in the operation and will be subsequently described.

The thus cooled gas passes on through a conduit 11 into an inlet of a second heat exchanger 12. This heat exchanger is chilled by a package refrigeration system 13. By this term, package referigration system, is meant a relatively small refrigeration system which is purchased from a manufacturer substantially as a unit. The refrigerant from this package refrigeration system 13 passes through exchanger 12 in indirect heat exchange with the gas or fluid from conduit 11. This heat exchanger 12 cools the fluid from conduit 11 to a temperature of about $-40°$ to about $-25°$ F. This thus further cooled fluid passes on through a conduit 3 into a separator vessel 14. In this vessel undesired or unabsorbed gas separates as a gas phase and liquid produced in the chilling operations and also a liquid added to conduit 11 separates as a liquid phase. This liquid added into conduit 11 is preferably a debutanized natural gasoline having a Reid vapor pressure of about 12 pounds. This natural gasoline is admitted to the system at a temperature of around $90°$ to $110°$ F. by way of conduit 2 from a source, not shown. This gasoline passes through a heat exchanger 16 in indirect heat exchange with the separated liquid from separator 14 passing through a conduit 5. This exchanger chills the natural gasoline to a temperature of about $-15°$ to $0°$ F. This gasoline is cooled to about the same temperature as the natural gas is cooled in exchanger 10. Upon adding this so-chilled gasoline by way of conduit 19 to the chilled natural gas in conduit 11 and on passing the mixed fluid through the heat exchanger 12 considerable dissolving or absorption of the desired hydrocarbons from the natural gas takes place. The mixed gas and liquid phases pass on through conduit 3 to separator vessel 14 as mentioned. The separated gas phase from separator 14 leaves this separator by way of a conduit 4 and at a temperature of about $-40°$ to about $-25°$ F. and at this temperature passes through exchanger 10 in indirect heat exchange with the incoming natural gas. This gas phase issues from exchanger 10 at a temperature of about $80°$ to about $100°$ F. This gas then is the dry gas product of the system. The gas is quite well depleted of its natural gasoline boiling range and liquefied petroleum gas hydrocarbons.

The liquid phase separated in separator 14 after passing through heat exchanger 16 in which it reaches a temperature of about $75°$ to about $95°$ F. passes into a second separator vessel 17. In this vessel a vapor phase is separated from the liquid phase at said temperature and at a pressure within a range of about 510 to about 610 p.s.i.a. The gas so separated in this separator contains a considerable proportion of hydrocarbon desired to be recovered and thus this gas is passed through a conduit 6 and is added to the raw gas of the process following dehydration. The liquid separated in separator 17 is the liquid product of the operation and contains the absorbent gasoline introduced into the system along with the absorbed hydrocarbons from the natural gas and is removed through a conduit 7 for disposal or subsequent treatment as desired.

A liquid level flow controller assembly 15 is provided in communication with separator 14 and conduit 5 downstream of a pump 20 for maintenance of a desired level of liquid in the separator. The warm separated liquid from exchanger 16 passes through a conduit 18 into the above-mentioned separator 17.

The absorbent natural gasoline entering the system and cooled in exchanger 16 to the above-mentioned −15° to 0° F. passes through a conduit 19 for addition to the chilled natural gas leaving exchanger 10.

The package refrigeration system 13 can be an ammonia system, a propane system, or such other suitable refrigerant system as desired.

The following Table I is a material balance in terms of moles per day of materials in process when treating a natural gas having the mole composition given in column 1 when introduced into the system at the rate of 4,000 m.s.c.f.d. (thousand standard cubic feet per day). The 12 pound natural gasoline employed in this operation is used in the ratio of 1 gallon per thousand standard cubic feet of gas flowing through conduit 1. Thus since 4 million cubic feet of gas are involved at this gasoline to gas ratio then 4,000 gallons of this 12 pound natural gasoline per day are required. This 1 gallon per thousand cubic feet wet gas is not limiting since under some conditions it might be desired to use more than 1 gallon or less than one gallon per thousand cubic feet of gas.

The compositions given in this table are the composition of liquid and/or gas in the apparatus parts of the drawing.

Table 1

[Material balance, mols/day]

| Comp. | (1) | (2) | (4) | (5) | (6) | (7) |
|---|---|---|---|---|---|---|
| $N_2$ | 210 | | 210 | 3 | 3 | 0 |
| $C_1$ | 8,904 | | 8,773 | 451 | 320 | 131 |
| $C_2$ | 807 | | 643 | 254 | 90 | 164 |
| $C_3$ | 368 | | 142 | 270 | 44 | 226 |
| $iC_4$ | 45 | | 8 | 40 | 3 | 37 |
| $nC_4$ | 94 | 5 | 13 | 92 | 6 | 86 |
| $iC_5$ | 20 | 52 | 3 | 71 | 2 | 69 |
| $nC_5$ | 30 | 86 | 4 | 115 | 3 | 112 |
| $C_6$ | 19 | 67 | 1 | 86 | 1 | 85 |
| $C_7+$ | 10 | 57 | | 67 | | 67 |
| Total | 10,507 | 267 | 9,797 | 1,449 | 472 | 977 |

This operation, which involves use of 4,000 gallons per day of 12 pound natural gasoline, produces 11,264 gallons per day of total liquid issuing through conduit 7. This 11,264 minus 4,000 yields or gives 7,264 actual gallons of recovered liquid hydrocarbons. Such operation recovers 61.4% of the propane, 85.4% of the butane or $C_4$ hydrocarbons and 97.7% of the $C_5$ hydrocarbons. The $C_4$ and $C_5$ hydrocarbons include the corresponding isoparaffins and normal paraffins. Of the 4 million standard cubic feet per day of raw or wet gas introduced into the system the residue gas comprises 3,730,000 standard cubic feet per day. The difference between these gas volumes is the gaseous volume of the hydrocarbons absorbed and converted into liquid product which occupies 7,264 liquid gallons.

In the following Table 2 are given the specific temperatures in and out of the several heat exchangers involved in treating the 4 million standard cubic feet of gas with 4,000 gallons of natural gasoline per day to yield the 7,264 gallons of produced or recovered hydrocarbons.

Table 2

| | Temp., 0° F. | |
|---|---|---|
| | In | Out |
| 10—Exchanger: | | |
| Feed gas | +100 | −10 |
| Residue gas | −30 | +90 |
| 12—Exchanger: Feed gas | −10 | −30 |
| 16—Exchanger: | | |
| Lean absorbent | +100 | −10 |
| Rich absorbent | −30 | +90 |

In the following Table 3 are given additional temperatures and pressures of the above-mentioned gas and liquid streams at various process points illustrated on the drawing.

Table 3

| Process points | Temp., °F. | P.s.i.a. | Gas volume, m.s.c.f.d. | Liquid volume, g.p.d. |
|---|---|---|---|---|
| 9—Conduit | 100 | | 4,000 | |
| 14—Separator | −30 | 584.4 | | |
| 4—Conduit | −30 | | 3,730 | |
| 5—Conduit | −30 | 584.4 | | |
| 17—Separator | 90 | 594.4 | | |
| 6—Conduit | 90 | | 180 | |
| 19—Conduit | −10 | | | |
| 2—Conduit | | | | 4,000 |
| 7—Conduit | | | | 11,264 |
| Net gasoline produced | | | | 7,264 |

This 12 pound natural gasoline is 12 pound Reid vapor pressure natural gasoline and the Reid vapor pressure is determined by the ASTM method D323–37T.

The use of the apparatus and method of this invention saves the expense of a conventional absorber tower which in ordinary usage is a very expensive piece of equipment. Also corresponding lean oil and rich oil lines from stripper to absorber and absorber to stripper are not required. Also no specific distillation or stripping unit is required. Another advantage is that this apparatus and process can be used in an area where there are fractionating facilities available but not an oil circulating gasoline plant. Furthermore, since the liquid volumes flowing in this process are usually less than conventional absorption oil volumes, smaller pipes, smaller exchangers, and even smaller refrigeration equipment can be used because of the less absorbent to be circulated.

While certain embodiments of the invention have been described for illustrative purposes, the invention obviously is not limited thereto.

I claim:

1. A method for extracting natural gas gasoline boiling range hydrocarbons from a natural gas containing such hydrocarbons comprising chilling said natural gas from a temperature within the range of about 75° to 110° F. at a pressure within the range of about 500 to 600 p.s.i.a. to a temperature within the approximate range of −15° to 0° F. by indirect heat exchange with a gas phase as subsequently produced, mixing with the chilled natural gas a chilled natural gas gasoline having a Reid vapor pressure of about 12 pounds as determined by ASTM method D323–37T at a temperature within the approximate range of −15° to 0° F. at said pressure, further chilling this mixture by indirect heat exchange with a refrigerant to a temperature within the approximate range of −40° to −25° F. at about said pressure, separating this further cooled mixture at said pressure and at said temperature within said approximate range of −40° to −25° F. into a gas phase and a liquid phase, said gas phase being said gas phase as subsequently produced, passing said liquid phase at about its separation temperature and pressure in indirect heat exchange with a natural gas gasoline thereby producing the aforementioned chilled natural gas gasoline at a temperature within the approximate range of −15° to 0° F. and warming said liquid phase to a temperature within the approximate range of 75° to 100° F., separating this warmed liquid phase at a slightly higher pressure and at the last-mentioned temperature into a vapor phase and a natural gas gasoline product phase said slightly higher pressure facilitating injection of said vapor phase into the original natural gas stream, injecting this vapor phase at said slightly higher pressure into the original natural gas prior to the first-mentioned chilling, and withdrawing this separated natural gas gasoline product and the heat exchanged gas phase as products of the operation.

2. The method of claim 1 wherein said natural gas gasoline is a debutanized natural gas gasoline.

3. A method of extracting natural gasoline boiling range hydrocarbons from a natural gas produced at high pressure and containing such hydrocarbons, comprising the steps of:
  (a) chilling said natural gas to a temperature below about 0° F. substantially at said high pressure;
  (b) injecting into the chilled gas of step (a) a chilled debutanized gasoline at a temperature below 0° F., said gasoline having approximately a 12-pound Reid vapor pressure as determined by ASTM method D323–37T;
  (c) further chilling the gas-gasoline mixture of step (b);
  (d) separating the chilled gas-gasoline of step (c) into a gas phase and a liquid phase;
  (e) passing the gas phase of step (d) in indirect heat exchange with the natural gas in step (a) as chilling medium;
  (f) passing the liquid phase of step (d) in indirect heat exchange with said debutanized gasoline thereby producing the chilled debutanized gasoline of step (b) and a warmed liquid phase;
  (g) separating from the warmed liquid phase of step (f) a vapor phase and a product liquid phase;
  (h) adding the vapor phase of step (g) to said natural gas prior to the chilling of step (a);
  (i) recovering the gas phase from step (e) and the product liquid phase of step (g) as products of the operation; and
  (j) maintaining said high pressure substantially constant in the hydrocarbon flow in steps (a) thru (h).

References Cited by the Examiner
UNITED STATES PATENTS

| | | | |
|---|---|---|---|
| 2,274,094 | 2/42 | Rupp | 62—37 X |
| 2,500,353 | 3/50 | Gantt | 62—28 X |
| 2,596,785 | 5/52 | Nelly et al. | 62—28 X |
| 2,627,318 | 2/53 | Swerdloff | 62—28 X |
| 2,782,141 | 2/57 | King | 62—20 |
| 2,973,834 | 3/61 | Cicalese | 62—20 X |

NORMAN YUDKOFF, *Primary Examiner.*
ROBERT A. O'LEARY, *Examiner.*